United States Patent Office 3,055,948
Patented Sept. 25, 1962

3,055,948
HALOGEN CONTAINING POLYHYDRIC ALCOHOLS
Paul E. Hoch, Youngstown, and Jack S. Newcomer, Wilson, N.Y., assignors to Hooker Chemical Corporation, Niagara Falls, N.Y., a corporation of New York
No Drawing. Filed Nov. 18, 1959, Ser. No. 853,681
5 Claims. (Cl. 260—611)

This invention relates to novel halogen containing polyhydric alcohols prepared by reacting together decachlorooctahydro-1,3,4-methano - 2H - cyclobuta-[cd]-pentalene-2-one and an aliphatic polyhydric alcohol containing at least three hydroxyl groups. The halogen containing polyhydric alcohols of the present invention find utility in polymerization reactions, for example, in the preparation of fire resistant polyesters and fire resistant flexible, semi-rigid or rigid polyurethane foams. They also find utility as chemical intermediates.

Decachlorooctahydro - 1,3,4 - methano - 2H - cyclobuta-[cd]-pentalene-2-one was formerly known as decachlorotetrahydro-4,7-methanoindeneone, and may be prepared by treating hexachlorocyclopentadiene with sulfur trioxide. Decachlorooctahydro-1,3,4-methano-2H-cyclobuta-[cd]-pentalene-2-one has the formula $C_{10}Cl_{10}O$ and is believed to possess the box ketone structure below:

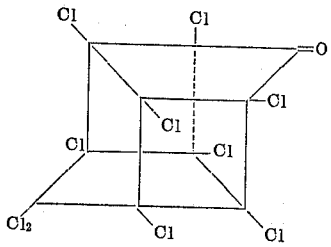

Decachlorooctahydro - 1,3,4 - methano - 2H - cyclobuta-[cd]-pentalene-2-one may be reacted with aliphatic dihydric alcohols, attacking the bivalent ketone structure to give

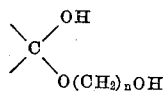

These products, however, are unreactive in polymerization reactions due to the lack of reactivity of the hydroxyl group attached directly to the ring. Similarly, the aliphatic monohydric alcohol adducts are unreactive in esterification reactions. It is highly desirable to obtain derivatives from decachlorooctahydro-1,3,4-methano-2H-cyclobuta-[cd]-pentalene-2-one which are reactive in polymerization reactions, due to the fact that the resulting polymer will have a large amount of stable, built-in chlorine, thus yielding a fire resistant polymeric product.

It is, therefore, an object of the present invention to prepare new and useful halogen containing polyhydric alcohols derived from decachlorooctahydro-1,3,4-methano-2H-cyclobuta-[cd]-pentalene-2-one. It is a further object of the present invention to prepare halogen containing polyhydric alcohols as above, which may be used to prepare fire resistant, polymeric products, such as polyesters and polyurethane foams. Further objects and advantages of the present invention will appear hereinafter.

It has been found that the aforementioned objects may be accomplished by reacting together decachlorooctahydro-1,3,4-methano-2H-cyclobuta-[cd]-pentalene-2-one and an aliphatic polyhydric alcohol containing at least three hydroxyl groups.

The halogen containing polyhydric alcohols of the present invention may be simply and expeditiously prepared by dissolving decachlorooctahydro-1,3,4-methano-2H-cyclobuta-[cd]-pentalene-2-one in a suitable solvent and heating with the desired polyol at an elevated temperature, preferably reflux. The time allowed for reaction will naturally vary with the purity of the reactants, the degree of completion of reaction desired, the reaction temperature, etc., but generally speaking from one to twenty-four hours are preferred. The solvent which is employed should be capable of dissolving the decachlorooctahydro - 1,3,4 - methano - 2H - cyclobuta - [cd] - pentalene-2-one, should be inert with respect to reactants and reaction products and have a sufficiently high boiling point to allow for reaction at elevated temperatures, without necessitating the application of superatmospheric pressure. Carbon tetrachloride is preferred for this purpose, but others that may be used include toluene, chlorobenzene, dioxane, etc. The product thus obtained may be isolated from solution by procedures known in the art.

Any aliphatic polyhydric alcohol may be used to react with decachlorooctahydro-1,3,4-methano-2H-cyclobuta-[cd]-pentalene-2-one, provided it contains at least three hydroxyl groups. Typical polyhydric alcohols of 3 to 15 carbon atoms include the following: glycerol; polyglycerol; hexanetriol; butanetriol; trimethylol propane; trimethylol ethane; pentaerythritol; polypentaerythritol; mannitol; sorbitol; methyltrimethylolmethane; octanetriol; butenetriol; butynetriol; hexenetriol; hexynetriol; octenetriol; octynetriol; etc. Furthermore, cellulose can also be used.

It is preferred to use equimolar proportions of aliphatic polyhydric alcohol to decachlorooctahydro-1,3,4-methano-2H-cyclobuta-[cd]-pentalene-2-one, but an excess of either reactant may be employed.

The halogen containing polyhydric alcohols of the present invention may also be used to prepare acrylate and methacrylate esters, which esters are useful monomers for vinyl polymerizations. In addition to this, the halogen containing polyhydric alcohols of the present invention are useful in the preparation of insecticides, for example, by reaction with cyclic sulfites. Many other useful products may be prepared from the halogen containing polyhydric alcohols of the present invention.

The following specific examples further illustrate the present invention.

*Example 1.—Preparation of Glycerol Adduct*

Eighty grams of dry decachlorooctahydro-1,3,4-methano-2H-cyclobuta-[cd]-pentalene-2-one were dissolved in three hundred cc. of carbon tetrachloride and 15.1 grams of glycerol were added. The solution which separated from the solvent on cooling as needle clusters were the expected adduct (65 grams), and had a melting point of three hundred degrees centigrade.

*Analysis.*—Calculated for $C_{13}H_8Cl_{10}O_4$: Cl, 60.9 percent. Found: Cl, 61.4 percent.

*Example 2.—Preparation of 1,2,6-Hexanetriol Adduct*

Twenty grams of decachlorooctahydro-1,3,4-methano-2H-cyclobuta-[cd]-pentalene-2-one, 5.4 grams of 1,2,6-hexanetriol and one hundred and fifty cubic centimeters of carbon tetrachloride were refluxed for about two hours, cooled and fifteen grams of the expected adduct were collected as crystals. They were recrystallized from carbon tetrachloride to give microcrystalline solids.

*Example 3.—Preparation of 1,2,4-Butanetriol Adduct*

Twenty grams of decachlorooctahydro-1,3,4-methano-2H-cyclobuta-[cd]-pentalene-2-one, 4.3 grams of 1,2,4-butanetriol and two hundred and fifty cubic centimeters of carbon tetrachloride were refluxed for about two hours. The solvent was stripped and 20 grams of the expected adduct was recovered as an oil which crystallized on standing.

Twenty grams of the above adduct was reacted with 4.4 grams of thionyl chloride at room temperature for about one hour in fifty cubic centimeters of carbon tetrachloride. The solvent was stripped and the expected thionyl chloride adduct (20 grams), was isolated as crystals. The crystals were recrystallized from carbon tetrachloride and had a melting point of from one hundred and sixty-five to one hundred and sixty-seven degrees centigrade.

*Analysis.*—Calculated for $C_{14}H_{12}Cl_{10}O_5S$: S, 4.98 percent. Found: S, 4.41 percent.

*Example 4.—Preparation of Trimethylol Propane Adduct*

Twenty grams of decachlorooctahydro-1,3,4-methano-2H-cyclobuta-[cd]-pentalene-2-one, 5.4 grams of trimethylol propane and one hundred and fifty cubic centimeters of carbon tetrachloride were refluxed for about two hours. Twenty grams of a solid crystallized out which was the expected adduct. The adduct was recrystallized from benzene.

Twenty grams of the above adduct was reacted with thionyl chloride in excess over the theoretical at room temperature for about one hour in fifty cubic centimeters of carbon tetrachloride. The solvent was stripped, and the expected thionyl chloride adduct (20 grams), was isolated as crystals. The crystals were recrystallized from carbon tetrachloride to give microcrystalline solids.

*Example 5.—Preparation of Rigid Polyurethane Foam*

(A) Eighty-six grams of the polyhydric alcohol of Example 1 was added slowly to three hundred and fifty grams of a mixture of eighty percent 2,4-tolylene diisocyanate and twenty percent 2,6-tolylene diisocyanate at one hundred degrees centigrade. After the final addition of the adduct the temperature was raised to one hundred and twenty degrees centigrade for one-half hour. The product was cooled and discharged to yield a low viscosity resinous product. (B) To one hundred and fifty grams of a polyester comprised of five moles trimethylol propane and three moles adipic acid condensed to an acid number of less than one, and having a hydroxyl number of five hundred and four, was added fifty grams of the polyhydric alcohol of Example 1, 0.5 gram dibutyltin dilaurate, 0.5 gram N-methyl morpholine, and 1.0 gram silicone oil. To this mixture was added a solution of one hundred and eighty-seven grams of the resinous material of Example 5(A), and fifty-eight grams of trichlorofluoromethane. The mixture was stirred rapidly for twenty seconds, then poured into a mold. The foam expanded at room temperature and cured within twenty-four hours at ambient temperatures. The final product had fine cell structure and was fire resistant.

The following example shows that the hydroxyl group attached directly to the ring is unreactive in esterification reactions.

*Example 6*

The ethyl alcohol adduct of decachlorooctahydro-1,3,4-methano-2H-cyclobuta-[cd]-pentalene-2-one (26.8 grams), sixty grams acetic anhydride and one drop of concentrated sulfuric acid were mixed at room temperature and a solid began to form. The solution was then warmed to fifty degrees centigrade, and after about thirty minutes the entire solution was solid. It was allowed to stand over night at room temperature, filtered and recrystallized from chloroform. The crystals which were isolated were identical with the starting material by infrared analysis.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency thereof.

We claim:

1. Polyhydric alcohol hemi-ketals of decachlorooctahydro-1,3,4-methano - 2H - cyclobuta - [cd] - pentalene-2-one wherein the polyhydric alcohol is an aliphatic polyhydric alcohol of 3 to 15 carbon atoms containing at least three hydroxyl groups.

2. A polyhydric alcohol hemi-ketal according to claim 1 wherein the aliphatic polyhydric alcohol is glycerol.

3. A polyhydric alcohol hemi-ketal according to claim 1 wherein the aliphatic polyhydric alcohol is 1,2,6-hexanetriol.

4. A polyhydric alcohol hemi-ketal according to claim 1 wherein the aliphatic polyhydric alcohol is trimethylol propane.

5. A polyhydric alcohol hemi-ketal according to claim 1 wherein the aliphatic polyhydric alcohol is 1,2,4-butanetriol.

References Cited in the file of this patent

McBee et al.: Journal American Chemical Soc., vol. 78 (1956), pages 1511–1512.